United States Patent [19]

Munjal et al.

[11] Patent Number: 4,939,230

[45] Date of Patent: Jul. 3, 1990

[54] ELIMINATION OF MONOCARBONATE FROM POLYCARBONATE

[75] Inventors: Sarat Munjal; Che I. Kao, both of Lake Jackson; Jimmy D. Allen, Freeport, all of Tex.

[73] Assignee: The Dow Chemical Company, Midland, Mich.

[21] Appl. No.: 272,150

[22] Filed: Nov. 16, 1988

[51] Int. Cl.$^5$ .............................................. C08G 63/62
[52] U.S. Cl. ................... 528/198; 528/196; 528/199; 528/370; 528/371
[58] Field of Search ............... 528/198, 199, 196, 370, 528/371

[56] References Cited

U.S. PATENT DOCUMENTS

| | | | |
|---|---|---|---|
| 2,970,131 | 1/1961 | Moyer et al. | 528/196 |
| 3,026,298 | 3/1962 | Lee et al. | 528/198 |
| 3,160,606 | 12/1964 | Dietrich et al. | 528/196 |
| 4,384,108 | 5/1983 | Campbell et al. | 528/196 |
| 4,431,793 | 2/1984 | Rosenquist | 528/198 |
| 4,448,953 | 5/1984 | Rosenquist et al. | 528/198 |
| 4,471,104 | 9/1984 | Krishnan et al. | 528/198 |
| 4,503,213 | 3/1985 | Krishnan et al. | 528/198 |
| 4,737,573 | 4/1988 | Silva et al. | 528/371 |
| 4,864,011 | 9/1989 | Bussink et al. | 528/198 |

*Primary Examiner*—Harold D. Anderson
*Attorney, Agent, or Firm*—John A. Langworthy

[57] ABSTRACT

A polycarbonate composition, and process for making same, wherein the monocarbonate and dicarbonate content is eliminated or limited to negligibly low levels by withholding introduction of chain terminator to the reaction mixture until the reaction of dihydroxy and carbonic acid derivative starting materials has run substantially to completion.

49 Claims, No Drawings

ELIMINATION OF MONOCARBONATE FROM POLYCARBONATE

BACKGROUND OF THE INVENTION

This invention relates to polycarbonate, and the production thereof, where a chain terminator has been utilized in the manufacturing process, and to molded articles such as compact discs made from such polycarbonate.

It is known to produce polycarbonate by the reaction of a dihydroxy compound, particularly an aromatic dihydroxy compound such as the diol Bisphenol-A, with a derivative of carbonic acid, such as phosgene. A chain terminator is often added to the reaction mixture for the purpose of regulating the molecular weight of the polycarbonate product. When used, the prevalent practice in the art is to include the chain terminator in the monomer mix which is initially charged to the reaction vessel. The dihydroxy compound and the chain terminator are consequently both present in the reaction mixture when it is contacted with the carbonic acid derivative.

In the manufacture of polycarbonate as described above, molecules of varying degrees of polymerization are obtained. The chain terminator is useful for the purpose of attempting to confine a large percentage of the molecules to a preselected molecular weight range. However it has been found that, even when a terminator is used according to the practice in the art as described above, not all molecules conform to the preselected weight range, and some molecules of extremely low molecular weight (carbonate byproducts) can still result.

Carbonate byproducts, being the smallest of the molecules resulting from the production of polycarbonate, have the lowest respective boiling points and are therefore the most likely to exist in vapor phase. The presence of carbonate byproducts in vapor phase becomes a consideration when polycarbonate is, for example, being extruded or molded, or heated for any other purpose. Accordingly, it would be desirable to prevent or limit the formation of carbonate byproducts in polycarbonate, and thereby assist in the manufacture of a polycarbonate product wherein the greatest possible percentage of the molecules fall within the preselected molecular weight range which it is the purpose of the terminator to achieve.

SUMMARY OF THE INVENTION

In one aspect, this invention is a polycarbonate composition which is free of, or substantially free of, monocarbonate. In another aspect, this invention is a polycarbonate composition which contains no more than Z ppm of dicarbonate where Z is given by $\log_{10}(Z) = 14.045216 - 2.4921524 \log_{10}(Mw)$, and "Mw" is the weight average molecular weight of said composition. In yet another aspect, this invention is a process for making polycarbonate wherein monocarbonate does not form, or substantially does not form. In yet another aspect, this invention is a process for making a polycarbonate composition wherein dicarbonate does not form in an amount in excess of Z ppm where Z is as given above. In yet another aspect, this invention is a process for preventing, or substantially preventing, the formation of monocarbonate in polycarbonate. In yet another aspect, this invention is a process for limiting the formation of dicarbonate, in a polycarbonate composition, to no more than Z ppm where Z is as given above.

It has surprisingly been discovered that, in the production of polycarbonate by the reaction of a dihydroxy compound with a carbonic acid derivative and a chain terminator, formation of monocarbonate in the reaction product can be prevented, and the formation of dicarbonate can be limited to a low amount related to the molecular weight of the polycarbonate, by withholding the addition of chain terminator to the reaction mixture until the reaction of the dihydroxy compound with the carbonic acid derivative is complete, as indicated by an increase of the heat of reaction to a constant level. ("Monocarbonate" and "dicarbonate" are carbonate byproducts which are more particularly defined hereinbelow.) Polycarbonate which is free or substantially free of monocarbonate and/or which contains the aforesaid reduced level of dicarbonate is an improved product, and the process for making polycarbonate of such quality is correspondingly an improved process, in comparison to the known art. The presence of such carbonate byproducts, especially monocarbonate, often causes partial plugging of mold vents and thus uneven flow of molten extrudate into all parts of a mold cavity, leaving imperfections in finished articles made of polycarbonate by injection molding, e.g., a phenomenon known as "ghost lines" or "ghosting" in the production of compact discs.

The improved polycarbonate of this invention, and polycarbonate made by the improved process hereof, is useful, for example, in the production of moldings, films, fibers, optical products and shaped articles of virtually all varieties, especially for compact discs, appliance and instrument housings, and other items for the electronics and automotive industries.

DESCRIPTION OF THE PREFERRED EMBODIMENTS

"Monocarbonate", when used in this description and in the claims appended hereto, means a carbonate byproduct which can result during the production of polycarbonate, when a dihydroxy compound, a carbonic acid derivative and a chain terminator make up the monomer mix, from a side reaction directly between the chain terminator and the carbonic acid derivative. Monocarbonate contains one carbonyl carbon and two terminator units and therefore contains no dihydroxy units. Correspondingly, "dicarbonate" as used in the description and claims hereof means a carbonate byproduct resulting when two carbonic acid units have been coupled by a dihydroxy unit but then have been stopped from further such coupling by the terminator. Dicarbonate contains one carbonyl carbon and terminator unit linked to a second carbonyl carbon and terminator unit by a dihydroxy unit. Monocarbonate is sometimes also referred to herein as "$L_o$", signifying a linear carbonate byproduct containing no dihydroxy units, and dicarbonate is correspondingly sometimes referred to herein as "$L_1$".

For example, in the case where Bisphenol-A is phosgenated in the presence of para-t-butyl phenol ("PTBP") as a terminator, the compound referred to as $L_o$ (no Bisphenol-A units, i.e. the monocarbonate) will result when PTBP reacts directly with phosgene. $L_o$ in such case is di(tert-butyl) phenyl carbonate. If phenol had been used as the terminator, $L_o$ would be diphenyl carbonate, and if 4-(tert-octyl) phenol had been used as the terminator, $L_o$ would be di-4-(tert-octyl)-phenyl carbonate. These phenolic carbonates have the general formula

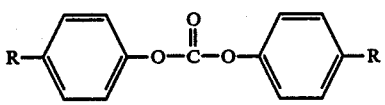

where R, in the cases mentioned above, is t-butyl, H or tert-octyl, respectively. Correspondingly, when each end of one Bisphenol-A unit has reacted with a phosgene molecule before terminator has capped those phosgene molecules, the compound referred to as $L_1$ (one Bisphenol-A unit, i.e. the dicarbonate) is produced. $L_1$ in such case has the formula

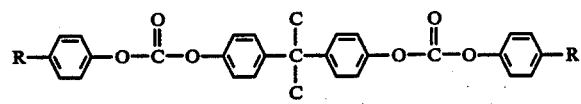

where R would be as set forth above according to the terminator used.

The compositions of this invention, and processes for making same, wherein $L_o$ forms only in an amount less than 100 ppm, preferably forms only in a negligible, insignificant quantity or amount (e.g., less than 20 ppm), more preferably substantially does not form (e.g., forms in an amount less than 3 ppm), and most preferably does not form, and wherein $L_1$ in excess of $Z$ ppm does not form where $Z$ is given by $\log_{10}(Z) = 14.045216 - 2.4921524\log_{10}(Mw)$, and "Mw" is the weight average molecular weight of said composition, are obtained by adding chain terminator during polycarbonate production in an advantageous manner improved over the art.

It is known in the art to produce polycarbonate by the reaction of a carbonic acid derivative with a dihydroxy compound, such as an aliphatic or aromatic diol. Suitable dihydroxy compounds are those wherein the sole reactive groups are the two hydroxyl groups, such as (1) a compound represented by the general formula $HO-R^2-OH$ where $R^2$ is any substituted or unsubstituted arylene or divalent aliphatic (cyclic or chain) hydrocarbon radical, or a mixture of more than one of said radicals, or (2) variously bridged, substituted or unsubstituted aromatic diols represented by the general formula

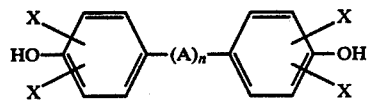

where
(a) A is a divalent hydrocarbon radical containing 1-15 carbon atoms, or is a mixture of more than one of such radicals, or is

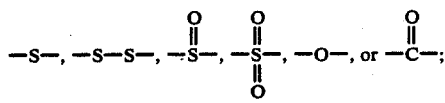

(b) X is independently hydrogen, chlorine, bromine or fluorine; or is a monovalent hydrocarbon radical such as an alkyl group of 1-4 carbons, an aryl group of 6-8 carbons such as phenyl, tolyl or xylyl, an alkoxy group of 1-4 carbons or an aryloxy group of 6-8 carbons: and
(c) n is 0 or 1.

The dihydroxy compounds employed in this invention advantageously include the trityl diols described in U.S. Pat. Nos. 3,036,036, 3,036,037, 3,036,038 and 3,036,039; the bis(ar-hydroxy-phenyl)alkylidenes (often called the bisphenol-A type diols), including their aromatically and aliphatically susbtituted derivatives, such as disclosed in U.S. Pat. Nos. 2,999,835, 3,038,365, 3,334,154 and 4,299,928; aromatic diols such as described in U.S. Pat. No. 3,169,121; dihydroxy benzenes; resorcinol; hydroquinone; halo- and alkyl-substituted dihydroxy benzenes; and dihydroxy diphenyl sulfides such as bis(4-hydroxyphenyl) sulfide. Two or more different dihydroxy compounds may be used in the event a carbonate copolymer or interpolymer rather than a homopolymer is desired Each of the above mentioned patents is incoporated herein in its entirety.

One group of suitable dihydroxy compounds includes the following dihydric phenols:
1,1-bis(4-hydroxyphenyl)-1-phenyl ethane
1,1-bis(4-hydroxyphenyl)-1,1-diphenyl methane
1,1-bis(4-hydroxyphenyl)cyclooctane
1,1-bis(4-hydroxyphenyl)cycloheptane
1,1-bis(4-hydroxyphenyl)cyclohexane
1,1-bis(4-hydroxyphenyl)cyclopentane
2,2-bis(3-propyl-4-hydroxyphenyl)decane
2,2-bis(3,5-dibromo-4-hydroxyphenyl)nonane
2,2-bis(3,5-isopropyl-4-hydroxyphenyl)nonane
2,2-bis(3,ethyl-4-hydroxyphenyl)octane
4,4-bis(4-hydroxyphenyl)heptane
3,3-bis(3-methyl-4-hydroxyphenyl)hexane
3,3-bis(3,5-difluoro-4-hydroxyphenyl)butane
2,2-bis(3,5-difluoro-4-hydroxyphenyl)butane
1,1-bis(3-methyl-4-hydroxyphenyl)ethane
1,1-bis(4-hydroxyphenyl)methane
2,2-bis(4-hydroxyphenyl)propane ("Bisphenol-A" or "Bis-A")
1,1-bis(4-hydroxyphenyl)-1-phenyl ethane ("Bisphenol-A-P" or "Bis-A-P")
2,2-bis(3,5-dibromo-4-hydroxyphenyl)propane ("Tetrabromo Bisphenol-A")
2,2-bis(3,5-dimethyl-4-hydroxyphenyl)propane ("Tetramethyl Bisphenol-A").

Another group of dihydroxy compounds useful in the practice of the present invention includes the following dihydroxyldiphenyl sulfoxides:
bis(3,5-diisopropyl-4-hydroxyphenyl)sulfoxide
bis(3-methyl-5-ethyl-4-hydroxyphenyl)sulfoxide
bis(3,5-dibromo-4-hydroxyphenyl)sulfoxide
bis(3,5-dimethyl-4-hydroxyphenyl)sulfoxide
bis(3-methyl-4-hydroxyphenyl)sulfoxide
bis(4-hydroxyphenyl)sulfoxide.

Another group of dihydroxy compounds which may be used in the practice of this invention includes the following dihydroxaryl sulfones:
bis(3,5-diisopropyl-4-hydroxyphenyl)sulfone
bis(3-methyl-5-ethyl-4-hydroxyphenyl)sulfone
bis(3-chloro-4-hydroxyphenyl)sulfone
bis(3,5-dibromo-4-hydroxyphenyl)sulfone
bis(3,5-dimethyl-4-hydroxyphenyl)sulfone
bis(3-methyl-4-hydroxyphenyl)sulfone
bis(4-hydroxyphenyl)sulfone.

Another group of dihydroxy compounds useful in the practice of this invention includes the following dihydroxydiphenyls:

3,3',5,5'-tetrabromo-4,4'-dihydroxydiphenyl
3,3'-dichloro-4,4'-dihydroxydiphenyl
3,3'-diethyl-4,4'-dihydroxydiphenyl
3,3'-dimethyl-4,4'-dihydroxydiphenyl
p,p'-dihydroxydiphenyl.

Another group of dihydroxy compounds which may be used in the practice of this invention includes the following dihydric phenol ethers:
bis(3-chloro-5-methyl-4-hydroxyphenyl)ether
bis(3,5-dibromo-4-hydroxyphenyl)ether
bis(3,5-dichloro-4-hydroxyphenyl)ether
bis(3-ethyl-4-hydroxyphenyl)ether
bis(3-methyl-4-hydroxyphenyl)ether
bis(4-hydroxyphenyl)ether.

The dihydroxy compounds mentioned above are suitable for the production of polycarbonate in the practice of this invention, and among those the most preferred are Bisphenol-A, Bisphenol-A-P, Tetrabromo Bisphenol-A and Tetramethyl Bisphenol-A. It has been found that polycarbonate produced from Bisphenol-A-P or Tetrabromo Bisphenol-A advantageously has a high glass transition temperature and other favorable high temperature properties.

A carbonic acid derivative suitable for use in this invention contains leaving groups which can be displaced from the carbonyl carbon in attack by the anion of a dihydroxy compound, and includes but is not necessarily limited to diesters of carbonic acid, and the carbonyl halides, of which the most preferred is phosgene (COCl$_2$).

The reaction to produce polycarbonate will proceed at, but is not restricted to, ambient temperature. Its rate will increase, especially toward the end of the reaction, if it is run at a somewhat elevated temperature of about 50° C. to about 125° C. More complete reaction between the dihydroxy compound and the carbonic acid derivative will occur if the reaction is run in the presence of a base. A starting pH of at least about 10 is preferred, with a pH in the range of about 11 to about 14 being more preferred. The presence of base in the reaction mixture helps convert the dihydroxy compound to its corresponding anion, which then reacts rapidly with the carbonic acid derivative. Suitable bases are the alkali or alkaline earth carbonates, oxides or hydroxides, or an organic base such as pyridine or an amine, with the most preferred of those being sodium hydroxide. The base may be added continuously or in incremental quantities during the reaction to maintain or restore the desired pH. The carbonate linkage is formed, and polymer growth occurs, when both leaving groups are displaced from the carbonic acid derivative in reaction with the anion formed from the dihydroxy compound If an organic base such as pyridine is used, the reaction could occur in a homogeneous solution containing the dihydroxy compound and the carbonic acid derivative, which solution would typically also contain an organic solvent such as the chlorinated hydrocarbon chloro benzene. This method, usually referred to as the solution process, is not as common as the interfacial process, wherein polycarbonate is produced in a two-phase system where the dihydroxy compound is dissolved or suspended in an aqueous solution of an inorganic base such as sodium hydroxide. An organic solvent capable of dissolving the polycarbonate product, such as the chlorinated hydrocarbon methylene chloride, makes up the other phase. This reaction mixture is contacted with the carbonic acid derivative, and the resulting polycarbonate product will accumulate in the organic phase In the case of either method, the solution containing the product is neutralized with acid and washed free of electrolytes, and the polycarbonate is then recovered by various known methods. The polymer resulting from the production methods described above is generally characterized by a repeating unit of the formula

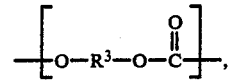

where —O—R$^3$—O— is the residue of the dihydroxy compound utilized. The polycarbonate chain contains up to about 200 such units, with the preferred chain length being about 20 to about 75 such units.

Methods for producing polycarbonate, as generally described above, and dihydroxy compounds and carbonic acid derivatives suitable for use as starting materials in the reaction mixture, are more particularly described in Moyer, U.S. Pat. Nos. 2,970,131 (Union Carbide); Schnell, 3,028,365 (Bayer AG); Freitag, 4,269,964 (Bayer AG) and Glass, 4,529,791 (Dow), each of which is incorporated as a part hereof in its entirety.

The improvements which are the subject of this invention relate to the timing of the addition of chain terminator to a polycarbonate reaction mixture containing a dihydroxy compound and a carbonic acid derivative. A terminator is a monofunctional compound containing a functional group, frequently a hydroxy group, which will produce an anion capable of displacing an unreacted hydroxy or carbonic acid ester group which remains on the end of a polymer chain. Representative of the terminators which are used for such purpose in the production of polycarbonate are phenol and the derivatives thereof, saturated aliphatic alcohols, metallic sulfites, alkyl acid chlorides, trialkyl- or triarylsilanols, monohalosilanes, amino alcohols, trialkyl alcohols, aniline and methylaniline. Of these, phenol, PTBP and 4-(1,1,3,3-tetramethylbutyl)-phenol (4-tert-octyl phenol) are the most preferred. Of the three preferred terminators just mentioned, 4-tert-octyl phenol has the highest boiling point and is therefore the least volatile.

When a terminator is used, the prevalent practice in the art is to admix the terminator with the monomers before the dihydroxy compound has been contacted with the carbonic acid derivative. Any terminator anion capable of attacking an hydroxy or carbonic acid ester end group on a polymer chain is also capable of undesirably either (1) attacking unreacted molecules of the initial charge of the carbonic acid derivative, or (2) displacing end groups before a chain has an opportunity to grow to the desired length. The practice in the art of adding chain terminator to the reaction mixture prior to introduction of the carbonic acid derivative consequently allows the formation of carbonate byproducts by the occurrence of both of the aforesaid results. For example, the tendency of monocarbonate to form can be seen from Campbell, U.S. Pat. No. 4,384,108 (G.E.), which is incorporated as a part hereof in its entirety, wherein (in Table II) a polycarbonate product containing 350 ppm of diphenyl carbonate is reported.

Carbonate byproduct content in excess of that specified for the improved product hereof typically detracts from the desirable properties and qualities of polycarbonate and, in most applications, may be seen as an impurity therein For example, when polycarbonate produced by phosgenating Bisphenol-A in the presence of PTBP is injection molded, plate-out (a powdery residue) frequently appears on the mold and/or the object being molded. Because of the undesirable effect on the quality of the polycarbonate product caused by the presence of $L_o$ and $L_1$, the $L_o$ content of the improved polycarbonate of this invention (and of the polycarbonate product of the improved process of this invention) at any molecular weight should be less than 100 ppm. Preferably, the product will contain only a negligible, insignificant quantity or amount of $L_o$ (e.g., less than 20 ppm), more preferably the product will be substantially free of $L_o$ (e.g., contain less than 3 ppm thereof) and most preferably the product will be free of $L_o$. The $L_1$ content should be limited to a low level related to the molecular weight of the polycarbonate, for example, the polycarbonate should contain no more than Z ppm of dicarbonate where Z is given by $\log_{10}(Z) = 14.045216 - 2.4921524 \log_{10}(Mw)$, and "Mw" is the weight average molecular weight of the polycarbonate composition.

Because of the desire to prevent the formation of $L_o$, and the desire to limit the formation of $L_1$ to low levels, an advantageous method for the production of polycarbonate has been discovered which is improved over the practice in the art. This improvement is accomplished by withholding addition of chain terminator to the reaction mixture until reaction of the dihydroxy compound with the carbonic acid derivative has proceeded to completion, as indicated by an increase in the heat of reaction to a constant level. (Methods for analyzing the temperature profile of a polycarbonate formation reaction are known in the art, as shown for example in Brunelle, U.S. Pat. No. 4,722,995 (G.E.), which is incorporated herein in its entirety.) Because the terminator is not present in the reaction mixture, premature attack by it on the unreacted portion of the carbonic acid derivative is not possible, thereby limiting the formation of $L_o$ to less than 100 ppm, preferably limiting the formation of $L_o$ to a negligible, insignificant quantity or amount (e.g., to less than 20 ppm), more preferably substantially preventing the formation of $L_o$ (e.g., $L_o$ formation of less than 3 ppm), and most preferably preventing the formation of $L_o$; with the additional result of limiting the formation of dicarbonate to no more than Z ppm, where Z is given by $\log_{10}(Z) = 14.045216 - 2.4921524 \log_{10}(Mw)$, and "Mw" is the weight average molecular weight of said polycarbonate. This process, the nature of the product resulting therefrom, and the improvements embodied therein, are more particularly illustrated by the data set forth below.

EXAMPLE 1

Monomer solution is prepared by adding 1,393 grams of 34% caustic (i.e. 473.62 grams of NaOH) to 1,350 grams of Bisphenol-A and 6,959 grams of water. This monomer solution is contacted with phosgene and methylene chloride solvent in a ⅜ inch (9.52 mm) diameter tubular reactor with a 2 minute residence time. Three 6 inch (15.24 cm) long and one 12 inch (30.48 cm) long [⅜ inch (9.52 mm) diameter] inline mixers were used to improve gas/liquid contacting. The monomer solution flow rate is set at 29 grams/minute. Phosgene flow rate is set at 2.4 grams/minute, and methylene chloride flow rate is set at 17 grams/minute. The polycarbonate oligomers formed from this process are separated from the aqueous layer. To 24 grams of the oligomers are added 21 grams of water and 2.42 grams of 10% solution of PTBP in methylene chloride. This mixture is placed in a 4 ounce (113.65 ml) glass bottle and shaken in a mechanical shaker for 5 minutes. This represents plug flow mixing of the terminator with the oligomers. After 5 minutes, 2.45 grams of 50% caustic (i.e. 1.225 grams NaOH) are added, and the mixture is shaken for another 5 minutes. After this 35 grams of methylene chloride and 1.75 grams of 1.5% solution of TEA (triethylamine) in methylene chloride are added, and the mixture is shaken until the completion of polymerization as indicated by the disappearance of the chloroformates. The polycarbonate product has a molecular weight of 17,400 and an $L_1$ content of 3,000 ppm, and $L_o$ is non-detectable therein.

EXAMPLE 2

The procedure of Example 1 is repeated except that 1.09 grams of 10% solution of PTBP in methylene chloride are used instead of 2.24 grams. The polycarbonate product has a molecular weight of 31,200 and $L_1$ content of 700 ppm, and $L_o$ is non-detectable therein.

EXAMPLE 3

A monomer solution consisting of 0.65 moles of Bisphenol-A, and 2 moles of NaOH per mole of Bisphenol-A, is phosgenated in a 2 inch (5.08 cm) pipe having three 5 inch (12.70 cm) mixers with a one minute total residence time during mixing. Phosgene addition to the reaction mixture is at the rate of 128 pounds (58.06 kg) per hour. 0.053 Moles of PTBP per mole of Bisphenol-A are added to the reaction mixture after it has passed the second mixer. 50% By weight caustic is then added to the reaction mixture at the rate of 93 pounds (42.18 kg) per hour. After completion of mixing, the reaction mixture is flashed in a stirred tank with a three minute residence time. Methylene chloride, at the rate of 600 pounds (272.15 kg) per hour, is then added to the stirred tank. After the reaction mixture is cooled, chain coupling catalyst (triethylamine) is added to complete the polymerization. The polycarbonate produced thereby has a molecular weight of 19,385, an $L_o$ content of 16 ppm and an $L_1$ content of 1,110 ppm.

EXAMPLE 4

The procedure of Example 1 is repeated except that phenol is used as the chain terminator instead of PTBP. The polycarbonate product has a molecular weight of 17,500 and an $L_1$ content of 3,200 ppm, and $L_o$ is non-detectable therein.

EXAMPLE 5

The procedure of Example 1 is repeated except that 4-(tert-octyl) phenol ("PTOP") is used as the chain terminator instead of PTBP. The polycarbonate product has a molecular weight of 16,323 and an $L_1$ content of 1,840 ppm, and $L_o$ is non-detectable therein.

EXAMPLE 6

Monomer solution is prepared by adding 1,420 grams of 34% caustic (i.e. 482.80 grams of NaOH) to 1,400 grams of Bisphenol-A-P and 7,316 grams of water. This monomer solution is contacted with phosgene and methylene chloride solvent in a 3/8 inch (9.52 mm) diameter tubular reactor with a 2 minute residence time. Three 6 inch (15.24 cm) long and one 12 inch (30.48 cm) long [⅜ inch (9.52 mm) diameter] inline mixers are used to improve gas/liquid contacting. The monomer solution flow rate is set at 30 grams/minute. Phosgene flow rate is set at 1.5 grams/minute, and methylene chloride flow rate is set at 21 grams/minute. The polycarbonate oligomers formed from this process are separated from the aqueous layer. To 19 grams of the oligomers are added 37 grams of water and 0.67 grams of 10% solution of PTBP in methylene chloride. This mixture is placed in a 4 ounce (113.65 ml) glass bottle and shaken in a mechanical shaker for 5 minutes. This represents plug flow mixing of the terminator with the oligomers. After 5 minutes, 2.1 grams of 50% caustic (i.e. 1.05 grams NaOH) are added, and the mixture is shaken for another 5 minutes. After this 21 grams of methylene chloride and 0.27 grams of 1.5% solution of TEA (triethylamine) in methylene chloride are added, and the mixture is shaken until the completion of polymerization as indicated by the disappearance of the chloroformates. The polycarbonate product has a molecular weight of 21,100 and an $L_1$ content of 860 ppm, and $L_o$ is non-detectable therein.

EXAMPLE 7

Monomer solution is prepared by adding 1,420 grams of 34% caustic (i.e. 482.80 grams of NaOH) to 1,400 grams of Bisphenol-A-P and 7,316 grams of water. This monomer solution is contacted with phosgene and methylene chloride solvent in a ⅜ inch (9.52 mm) diameter tubular reactor with a 2 minute residence time. Three 6 inch (15.24 cm) long and one 12 inch (30.48 cm) long [⅜ inch (9.52 mm) diameter] inline mixers were used to improve gas/liquid contacting. The monomer solution flow rate is set at 30 grams/minute. Phosgene flow rate is set at 1.5 grams/minute, and methylene chloride flow rate is set at 21 grams/minute. The polycarbonate oligomers formed from this process are separated from the aqueous layer. To 27 grams of the oligomers are added 29 grams of water and 0.67 grams of 10% solution of PTBP in methylene chloride. This mixture is placed in a 4 ounce (113.65 ml) glass bottle and shaken in a mechanical shaker for 5 minutes. This represents plug flow mixing of the terminator with the oligomers. After 5 minutes, 2.1 grams of 50% caustic (i.e. 1.05 grams NaOH) are added, and the mixture is shaken for another 5 minutes. After this 21 grams of methylene chloride and 0.27 grams of 1.5% solution of TEA (triethylamine) in methylene chloride are added, and the mixture is shaken until the completion of polymerization as indicated by the disappearance of the chloroformates. The polycarbonate product has a molecular weight of 30,600 and an $L_1$ content of 150 ppm, and $L_o$ is non-detectable therein.

Measurement of the quantity of $L_o$ and $L_1$ in the polycarbonate samples made in the foregoing examples was accomplished by high-performance reverse-phase liquid chromatography. The products were analyzed on a Hewlett Packard 1090 chromatograph, using a 15 cm×4 mm I.D. column, packed with Spherisorb ODS II three micron packing. Tetrahydrofuran/H2O was used as the carrier solvent. UV absorbtion at 264±5 nm was determined for each oligomer as it eluted from the column. Absorbtion peaks were compared to those generated by standardization samples containing carefully measured amounts of mono- and dicarbonate.

In Examples 1-2 and 4-7, $L_o$ content of below 50 ppm was not detectable by this method of measurement. The "ND" (non-detectable) result reported (in Table I) for $L_o$ content in those examples therefore indicates that $L_o$ content was less than 50 ppm. In Example 3, and with respect to an additional analysis of the product of Example 2, the limit of detection was lowered by precipitating the polycarbonate product to be analyzed from a methylene chloride solution with an antisolvent in which the polymeric polycarbonate is not soluble (such as n-heptane), evaporating the supernatant liquid, and then redissolving the polycarbonate in the chromatographic solvent, Tetrahydrofuran. The limit of detection of $L_o$ when these additional measures were taken was 3 ppm. $L_o$ was again non-detectable in the product of Example 2 when it was analyzed using the additional precipitation, and the $L_o$ content was thus shown to in fact be less than 3 ppm, not just less than 50 ppm.

All of the foregoing examples, which are summarized below in Table I, demonstrate that, when chain terminator is utilized in the production of polycarbonate by the reaction of a dihydroxy compound with a carbonic acid derivative, if the reaction between the dihydroxy compound and the carbonic acid derivative is allowed to run to completion before the terminator is added to the reaction mixture, the formation of $L_o$ is prevented, or is substantially prevented, yielding a polycarbonate product which is purified of, or is free, or substantially free, of $L_o$. Additionally, the formation of $L_1$ is limited to no more than an amount Z in ppm where Z is given by $\log_{10}(Z) = 14.045216 - 2.4921524 \log_{10}(Mw)$, and "Mw" is the weight average molecular weight of the polycarbonate composition. (While this relationship has been derived from a log-log regression plot based on the data resulting from production of polycarbonate by reacting Bisphenol-A with phosgene and PTBP, the corresponding relationship can be derived by one skilled in the art, with respect to polycarbonate based on other starting materials, by following the same approach. The value "Z", as determined by the equation set forth above, is given in Table I for the product of Examples 1, 2 and 3, each of which is the product of the reaction of Bisphenol-A, phosgene and PTBP.)

TABLE I

| Ex. | Dihydroxy Compound | Terminator | M.W. grams | $L_0$ ppm | $L_1$ ppm | "Z" ppm |
|---|---|---|---|---|---|---|
| 1 | Bis-A | PTBP | 17,400 | ND | 3,000 | 3,000 |
| 2 | Bis-A | PTBP | 31,200 | ND | 700 | 700 |
| 3 | Bis-A | PTBP | 19,385 | 16 | 1,110 | 2,292 |
| 4 | Bis-A | Phen. | 17,500 | ND | 3,200 | — |
| 5 | Bis-A | PTOP | 16,323 | ND | 1,840 | — |
| 6 | Bis-A-P | PTBP | 21,100 | ND | 860 | — |
| 7 | Bis-A-P | PTBP | 30,600 | ND | 150 | — |

Since this invention is based on the reproducable step of withholding addition of chain terminator to the reaction mixture until the reaction of the dihydroxy compound and the carbonic acid derivative has run to completion, as indicated by an increase of the heat of reaction to a constant level, the improved polycarbonate product described herein is obtainable with virtually any combination of the dihydroxy compounds, carbonic acid derivatives and chain terminators mentioned herein. For example, in a given situation it might be desired to make polycarbonate using a dihydroxy compound such as Bisphenol-A-P or Tetrabromo Bisphenol-A. Or, it might be desired to use phenol or p-t-octyl phenol as the terminator in such polycarbonate rather than p-t-butyl phenol.

It is within the skill in the art to practice this invention in numerous modifications and variations in light of the above teachings. It is, therefore, to be understood that changes may be made in the various described embodiments of this invention without departing from the spirit and scope of this invention as defined by the appended claims. For example, fillers and modifiers have found wide usage in polycarbonate products. These might include reinforcing agents, pigments, lubricants, mold release agents, clays, carbon black, asbestos, and stabilizers such as glass fibers or to retard UV degredation or impart ignition resistance. Addition of any one or more of those in the polycarbonate product and process of this invention would not be a departure therefrom. Additionally, there are numerous aspects of polycarbonate production, other than those described herein, which are known and frequently employed by those skilled in the art. There are, for example, many known kinds of solvents, chain coupling catalysts, branching agents, reducing agents and product recovery techniques which are utilized in the production of polycarbonate. One skilled in the art could readily utilize one or more of the aforesaid in the practice of this invention without departing from the scope thereof.

What is claimed is:

1. A composition comprising a carbonate polymer which is the product of the reaction of a dihydroxy compound with a carbonic acid derivative and a chain terminator containing a hydroxy group, which composition is free of monocarbonate.

2. A composition comprising a carbonate polymer which is the product of the reaction of a dihydroxy compound with a carbonic acid derivative and a chain terminator containing a hydroxy group, which composition contains only a negligible, insignificant amount of monocarbonate.

3. A composition comprising a carbonate polymer which is the product of the reaction of Bisphenol-A with phosgene and para-t-butyl phenol, and which contains only a negligible, insignificant amount of monocarbonate and contains no more than Z ppm of dicarbonate where Z is given by $\log_{10}(Z)=14.045216-2.4921524\log_{10}(Mw)$, and "Mw" is the weight average molecular weight of said composition.

4. A composition comprising a carbonate polymer which is the product of the reaction of Bisphenol-A with phosgene and para-t-butyl phenol, and which contains less than 100 ppm of monocarbonate and contains no more than Z ppm of dicarbonate where Z is given by $\log_{10}(A)=14.045216-2.4921524\log_{10}(Mw)$, and "Mw" is the weight average molecular weight of said composition.

5. A composition comprising a carbonate polymer which is the product of the reaction of a dihydroxy compound, other than Bisphenol-A, with a carbonic acid derivative and a chain terminator containing a hydroxy group, which composition contains less than 100 ppm of monocarbonate.

6. A composition comprising a carbonate polymer which is the product of the reaction of a dihydroxy compound with a carbonic acid derivative and a chain terminator containing a hydroxy group, other than para-t-butyl phenol, which composition contains less than 100 ppm of monocarbonate.

7. The composition of claim 1, 2 or 5 wherein the chain terminator is para-t-butyl phenol, phenol or 4-(tert-ocyl) phenol.

8. The composition of claim 1, 2 or 6 wherein the dihydroxy compound is Bisphenol-A, Bisphenol-A-P, Tetrabromo Bisphenol-A or Tetramethyl Bisphenol-A.

9. The composition of claim 1 or 2 wherein the dihydroxy compound is Bisphenol-A and the chain terminator is para-t-butyl phenol.

10. A process for making polycarbonate comprising
(a) forming a reaction mixture which comprises a dihydroxy compound, a carbonic acid derivative, a solvent, and sufficient base to bring about the formation of polycarbonate, and
(b) employing in said reaction mixture a chain terminator, containing a hydroxy group, such that monocarbonate does not form.

11. A process for making polycarbonate comprising
(a) forming a reaction mixture which comprises a dihydroxy compound, a carbonic acid derivative, a solvent, and sufficient base to bring about the formation of polycarbonate, and
(b) employing in said reaction mixture a chain terminator, containing a hydroxy group, such that monocarbonate forms only in a negligible, insignificant amount.

12. A process for making polycarbonate comprising
(a) forming a reaction mixture which comprises Bisphenol-A, phosgene, a solvent, and sufficient base to bring about the formation of polycarbonate, and
(b) employing para-t-butyl phenol in said reaction mixture such that monocarbonate forms only in a negligible, insignificant amount, and dicarbonate in excess of Z ppm does not form where Z is given by $\log_{10}(Z)=14.04526-2.4921524\log_{10}(Mw)$, and "Mw" is the weight average molecular weight of said polycarbonate.

13. A process for making polycarbonate comprising
(a) forming a reaction mixture which comprises a dihydroxy compound, a carbonic acid derivative, a solvent, and sufficient base to bring about the formation of polycarbonate, and
(b) employing in said reaction mixture a chain terminator, containing a hydroxy group, such that monocarbonate forms only in an amount less than 100 ppm.

14. A process for making polycarbonate comprising
(a) forming a reaction mixture which comprises Bisphenol-A, phosgene, a solvent, and sufficient base to bring about the formation of polycarbonate, and
(b) employing para-t-butyl phenol in said reaction mixture such that monocarbonate forms only in an amount less than 100 ppm and dicarbonate in excess of Z ppm does not form where Z is given by $\log_{10}(Z)=14.045216-2.4921524 \log_{10}(Mw)$, and "Mw" is the weight average molecular weight of said polycarbonate.

15. The process of claim 10, 11 or 13 wherein the dihydroxy compound is Bisphenol-A, Bisphenol-A-P, Tetrabromo Bisphenol-A or Tetramethyl Bisphenol-A.

16. In the manufacture of polycarbonate which is the product of contacting a dihydroxy compound with a carbonic acid derivative and a chain terminator containing a hydroxy group, a process for preventing the formation of monocarbonate, comprising the steps in sequence of
(a) contacting said dihydroxy compound with said carbonic acid derivative in a reaction mixture containing a solvent and sufficient base to give such reaction mixture a pH of greater than about 10, thereby forming polycarbonate, and
(b) adding said chain terminator to said reaction mixture when the heat of said reaction has increased to a constant level.

17. In the manufacture of polycarbonate which is the product of contacting a dihydroxy compound with a carbonic acid derivative and a chain terminator containing a hydroxy group, a process for limiting the formation of monocarbonate to a negligible, insignificant amount, comprising the steps in sequence of
  (a) contacting said dihydroxy compound with said carbonic acid derivative in a reaction mixture containing a solvent and sufficient base to give such reaction mixture a pH of greater than about 10, thereby forming polycarbonate, and
  (b) adding said chain terminator to said reaction mixture when the heat of said reaction has increased to a constant level.

18. In the manufacture of polycarbonate which is a product of contacting Bisphenol-A with phosgene and para-t-butyl phenol, a process for limiting the formation of monocarbonate to a negligible, insignificant amount and limiting the formation of dicarbonate to no more than Z ppm, where Z is given by $\log_{10}(Z)=14.045216-2.4921524\log_{10}(Mw)$, and "Mw" is the weight average molecular weight of said polycarbonate, comprising the steps in sequence of
  (a) contacting Bisphenol-A with phosgene in a reaction mixture containing a solvent and sufficient base to give such reaction mixture a pH of greater than about 10, thereby forming polycarbonate, and
  (b) adding para-t-butyl phenol to said reaction mixture when the heat of said reaction has increased to a constant level.

19. In the manufacture of polycarbonate which is the product of contacting a dihydroxy compound with a carbonic acid derivative and a chain terminator containing a hydroxy group, a process for limiting the formation of monocarbonate to less than 100 ppm, comprising the steps in sequence of
  (a) contacting said dihydroxy compound with said carbonic acid derivative in a reaction mixture containing a solvent and sufficient base to give such reaction mixture a pH of greater than about 10, thereby forming polycarbonate, and
  (b) adding said chain terminator to said reaction mixture when the heat of said reaction has increased to a constant level.

20. In the manufacture of polycarbonate which is a product of contacting Bisphenol-A with phosgene and para-t-butyl phenol, a process for limiting the formation of monocarbonate to less than 100 ppm and limiting the formation of dicarbonate to no more than Z ppm, where Z is given by $\log_{10}(Z)=14.045216-2.4921524\log_{10}(Mw)$, and "Mw" is the weight average molecular weight of said polycarbonate, comprising the steps in sequence of
  (a) contacting Bisphenol-A with phosgene in a reaction mixture containing a solvent and sufficient base to give such reaction mixture a pH of greater than about 10, thereby forming polycarbonate, and
  (b) adding para-t-butyl phenol to said reaction mixture when the heat of said reaction has increased to a constant level.

21. The process of claim 16, 17 or 19 wherein the dihydroxy compound is Bisphenol-A, Bisphenol-A-P, Tetrabromo Bisphenol-A or Tetramethyl Bisphenol-A.

22. The process of claim 16, 17 or 19 wherein the chain terminator is para-t-butyl phenol, phenol or di(p-t-butyl) phenol.

23. The process of claim 16, 17 or 19 wherein the dihydroxy compound is Bisphenol-A and the chain terminator is para-t-butyl phenol.

24. The composition produced by the process of claim 10.

25. The composition produced by the process of claim 11.

26. The composition produced by the process of claim 12.

27. The composition produced by the process of claim 13.

28. The composition produced by the process of claim 14.

29. The composition produced by the process of claim 15.

30. The composition produced by the process of claim 16.

31. The composition produced by the process of claim 17.

32. The composition produced by the process of claim 18.

33. The composition produced by the process of claim 19.

34. The composition produced by the process of claim 20.

35. The composition produced by the process of claim 21.

36. The composition produced by the process of claim 22.

37. The composition produced by the process of claim 23.

38. A molded article comprised of a carbonate polymer which is the product of the reaction of a dihydroxy compound with a carbonic acid derivative and a chain terminator containing a hydroxy group, which article contains only a negligible, insignificant amount of monocarbonate.

39. A molded article comprised of a carbonate polymer which is the product of the reaction of Bisphenol-A with phosgene and para-t-butyl phenol, and which contains only a negligible, insignificant amount of monocarbonate and contains no more than Z ppm of dicarbonate where Z is given by $\log_{10}(Z)=14.045216-2.4921524\log_{10}(Mw)$, and "Mw" is the weight average molecular weight of said composition.

40. A molded article comprised of a carbonate polymer which is the product of the reaction of Bisphenol-A with phosgene and para-t-butyl phenol, and which contains less than 100 ppm of monocarbonate and contains no more than Z ppm of dicarbonate where Z is given by $\log_{10}(Z)=14.045216-2.4921524\ \log_{10}(Mw)$, and "Mw" is the weight average molecular weight of said composition.

41. A molded article comprised of a carbonate polymer which is the product of the reaction of a dihydroxy compound, other than Bisphenol-A, with a carbonic acid derivative and a chain terminator containing a hydroxy group, which article contains less than 100 ppm of monocarbonate.

42. A molded article comprised of a carbonate polymer which is the product of the reaction of a dihydroxy compound with a carbonic acid derivative and a chain terminator containing a hydroxyl group, other than para-t-butyl phenol, which article contains less than 100 ppm of monocarbonate.

43. A compact disc free of "ghosting" imperfections comprised of a carbonate polymer which is the product of the reaction of a dihydroxy compound with a carbonic acid derivative and a chain terminator containing hydroxy group, which compact disc contains only a negligible, insignificant amount of monocarbonate.

44. A compact disc comprised of a carbonate polymer which is the product of the reaction of Bisphenol-A with phosgene and para-t-butyl phenol, and which contains only a negligible, insignificant amount of monocarbonate and contains no more than Z ppm of dicarbonate where Z is given by $\log_{10}(Z) = 14.045216 - 2.4921524\log_{10}(Mw)$, and "Mw" is the weight average molecular weight of said composition.

45. A compact disc comprised of a carbonate polymer which is the product of the reaction of Bisphenol-A with phosgene and para-t-butyl phenol, and which contains less than 100 ppm of monocarbonate and contains no more than Z ppm of dicarbonate where Z is given by $\log_{10}(Z) = 14.045216 - 2.4921524\log_{10}(Mw)$, and "Mw" is the weight average molecular weight of said composition.

46. A compact disc comprised of a carbonate polymer which is the product of the reaction of a dihydroxy compound, other than Bisphenol-A, with a carbonic acid derivative and a chain terminator containing a hydroxy group, which compact disc contains less than 100 ppm of monocarbonate.

47. A compact disc comprised of a carbonate polymer which is the product of the reaction of a dihydroxy compound with a carbonic acid derivative and a chain terminator containing a hydroxy group, other then para-t-butyl phenol, which compact disc contains less than 100 ppm of monocarbonate.

48. A composition comprising a carbonate polymer which is the product of the reaction of a dihydroxy compound with a carbonic acid derivative and a chain terminator containing a hydroxy group, which composition is purified of monocarbonate.

49. A composition comprising a carbonate polymer which is the product of the reaction of Bisphenol-A with phosgene and para-t-butyl phenol, and which is purified of monocarbonate and contains no more than Z ppm of dicarbonate where Z is given by $\log_{10}(Z) = 14.045216 - 2.4921524\log_{10}(Mw)$, and "Mw" is the weight average molecular weight of said composition.

* * * * *

UNITED STATES PATENT AND TRADEMARK OFFICE
CERTIFICATE OF CORRECTION

PATENT NO. : 4,939,230

DATED : July 3, 1990

INVENTOR(S) : Sarat Munjal, Che I. Kao, Jimmy D. Allen

It is certified that error appears in the above-identified patent and that said Letters Patent is hereby corrected as shown below:

Column 4, line 18 shown as; "desired.Each ", should read; --desired. Each--.

Column 6, line 1 shown as; "phase In", should read; --phase. In--.

Column 6, line 68 shown as; "therein For", should read; --therein. For--.

Column 11, line 45 shown as; "(A)", should read; --(Z)--.

Column 12, line 26 shown as; "14.04526", should read; --14.045216--.

Column 14, line 58 shown as; "hydroxyl", should read --hydroxy--.

Column 16, line 4 shown as; "then", should read; --than--.

Signed and Sealed this

Twenty-eighth Day of April, 1992

Attest:

HARRY F. MANBECK, JR.

*Attesting Officer*      *Commissioner of Patents and Trademarks*